April 14, 1931.   B. F. BAKER   1,800,276
MOUNT FOR GUNS
Filed Nov. 1, 1928   2 Sheets-Sheet 1
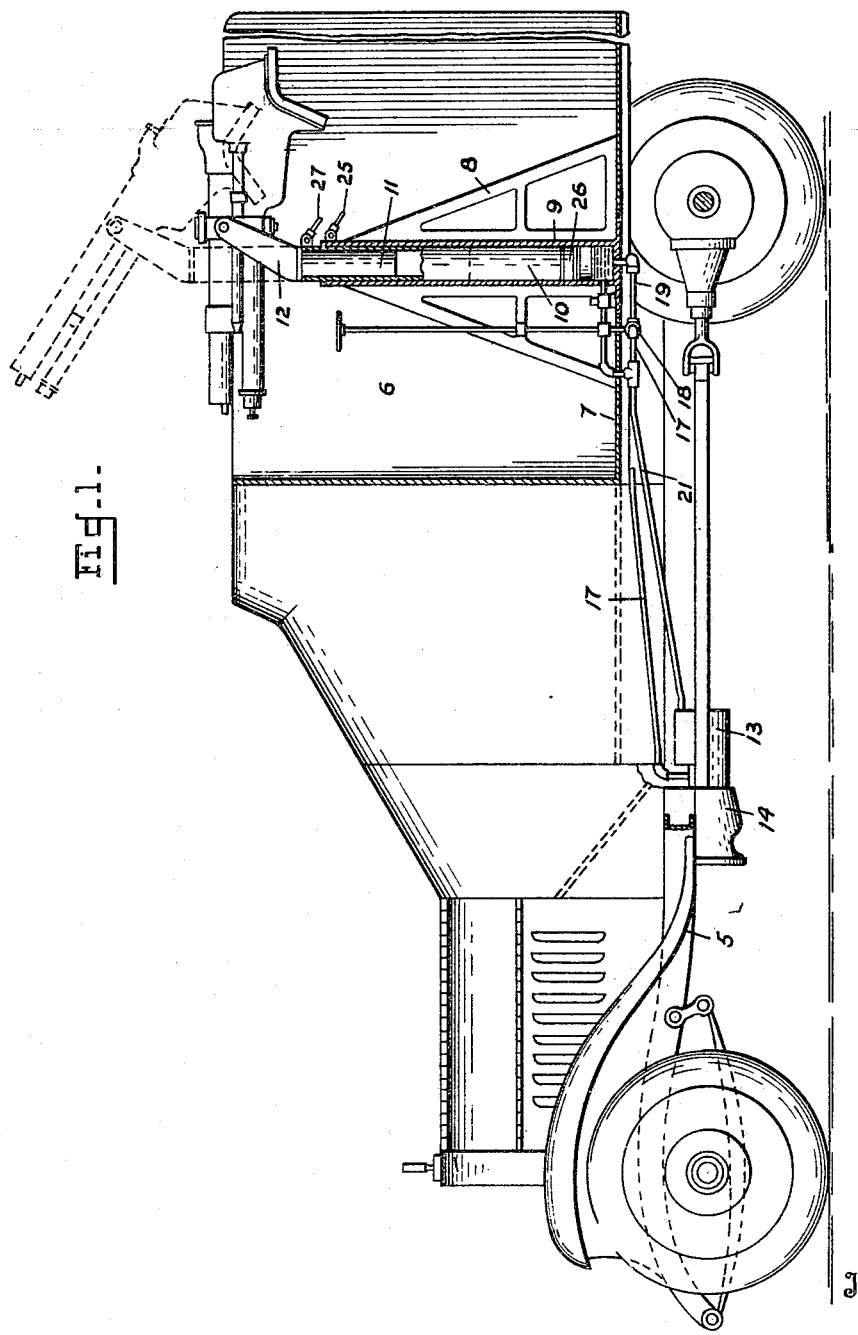
Inventor
Bert F. Baker
By W. N. Roach
Attorney April 14, 1931.                B. F. BAKER                1,800,276
                              MOUNT FOR GUNS
                      Filed Nov. 1, 1928        2 Sheets-Sheet 2
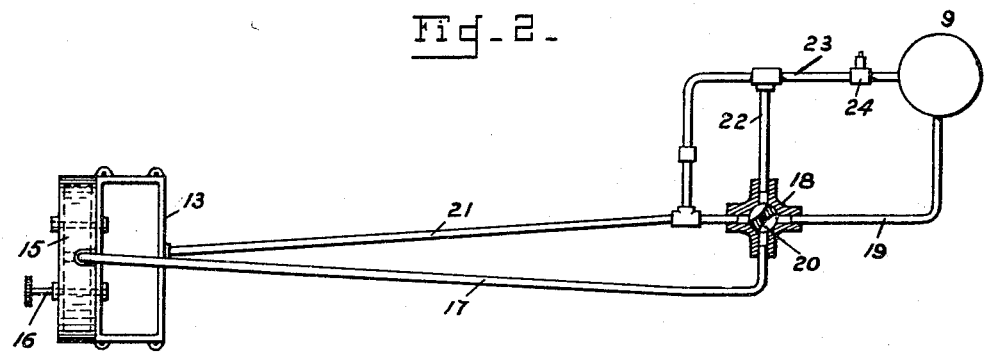
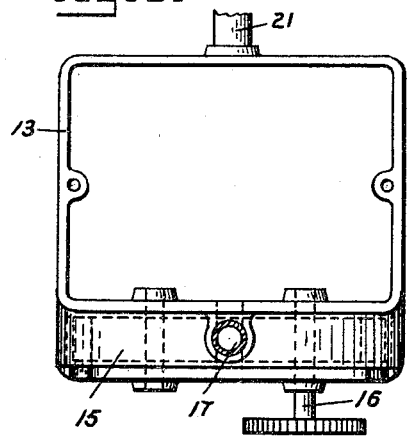
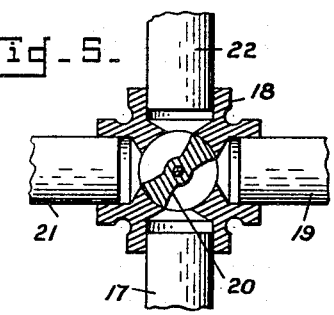
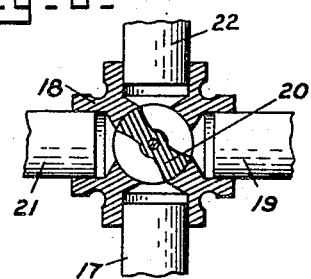
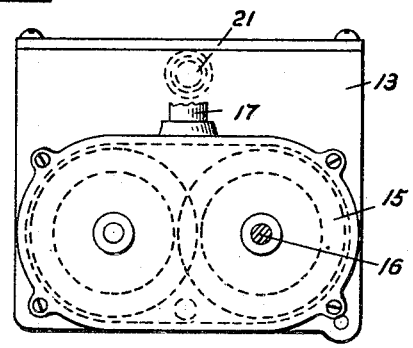
Inventor
Bert F. Baker
By W. N. Roach
Attorney Patented Apr. 14, 1931 1,800,276

UNITED STATES PATENT OFFICE

BERT F. BAKER, OF DAVENPORT, IOWA

MOUNT FOR GUNS

Application filed November 1, 1928. Serial No. 316,506.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a mount for guns.

In certain types of armored vehicles the gun mount is placed on the floor of the body and it is the purpose of this invention to take advantage of the favorable disposition of the gun mount with respect to the change speed transmission of the vehicle by associating with the transmission an hydraulic elevating mechanism for the mount.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation and partly in section, of a gun mount constructed in accordance with the invention;

Fig. 2 is a more or less diagrammatic view of the control system of the elevating mechanism;

Figs. 3 and 4 are respectively views in plan and end elevation of the fluid reservoir;

Figs. 5 and 6 are transverse sectional views through the valve.

Referring to the drawings by numerals of reference:

There is shown an automobile having a conventional chassis 5 on which is mounted an armored body 6 which is preferably uncovered. Secured to the floor 7 of the body is a pedestal 8 formed with a cylindrical bore 9 in which is mounted a piston 10, the upper portion of which receives the pintle 11 of a gun-carrying standard 12.

The standard is raised and lowered into and out of the firing position by an hydraulic force applied through the medium of a fluid contained in a reservoir or casing 13 attached to the change speed transmission box 14 of the vehicle. Within the casing 13 is a gear pump 15 actuated directly from an element of the transmission by means of a shaft 16. From the upper portion of the gear pump chamber an outlet line 17 leads to a four-way valve 18 which is connected by a short line 19 to the working cylinder 9 so that when the gate 20 is in the position shown in Fig. 5, the fluid may be available to raise the piston and elevate the gun. With the gate 20 in the position shown in Fig. 6, the fluid is directed into the main return line 21, leading to the casing 13. The short auxiliary return line 22 is conveniently connected to a by-pass line 23, leading from the cylinder 9 to the main return line 21. The by-pass is provided with a relief valve 24 which is brought into operation when the piston is positively held in a raised position by means of a clamp 25. When the gun is in operation, it is desirable to maintain pressure in the cylinder so that additional elevation and controlled lowering of the gun standard may be immediately accomplished without interruption of firing. The incorporation of the relief valve 24 relieves the overpressure and permits the use of a simple packing 26 on the piston.

A clamp 27 is provided for holding the standard against rotation when the mount is in the travelling position.

I claim:

1. The combination with a motor vehicle having a change speed transmission and a fluid reservoir and gear pump associated with the transmission, of a pedestal having a working cylinder on the floor of the vehicle, a gun-carrying standard fitted in the cylinder, a fluid line leading from the cylinder, a valve in said line, an intake line and a return line leading from the valve to the reservoir, a by-pass line leading from the cylinder to the return line and a relief valve in said by-pass line and means for locking the piston to the cylinder.

2. In a motor vehicle including a change speed transmission, a pedestal having a working cylinder on the floor of the vehicle, a gun carrying standard fitted in the cylinder and hydraulic elevating mechanism between the transmission and the working cylinder and means for locking the piston to the cylinder.

3. The combination with a motor vehicle having a change speed transmission and casing, of a fluid reservoir and gear pump associated with the transmission and casing, the gear pump being driven from an element of the transmission, a pedestal having a working cylinder on the floor of the vehicle, a piston in the cylinder, a gun-carrying standard rotatably mounted in the piston, a fluid line between the gear pump and cylinder whereby the piston is elevated, a valve in said line, a return line between the valve and reservoir, a by-pass line from the cylinder to the return line, a relief valve in said by-pass line, and means for locking the piston to the cylinder.

4. The combination with a motor vehicle having a change speed transmission and casing, of a fluid reservoir and gear pump associated with the transmission and casing, the gear pump being driven from an element of the transmission, a pedestal having a working cylinder on the floor of the vehicle, a piston in the cylinder, a gun-carrying standard rotatably mounted in the piston, hydraulic connections from the fluid reservoir and gear pump to the cylinder, and means for locking the piston to the cylinder.

BERT F. BAKER.